United States Patent
Fang et al.

(10) Patent No.: US 11,514,667 B1
(45) Date of Patent: Nov. 29, 2022

(54) METHOD AND SYSTEM FOR CAMERA-FREE LIGHT FIELD VIDEO PROCESSING WITH ALL-OPTICAL NEURAL NETWORK

(71) Applicant: Tsinghua University, Beijing (CN)

(72) Inventors: Lu Fang, Beijing (CN); Tiankuang Zhou, Beijing (CN); Siyuan Gu, Beijing (CN); Xiaoyun Yuan, Beijing (CN); Qionghai Dai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/704,202

(22) Filed: Mar. 25, 2022

(30) Foreign Application Priority Data

Sep. 27, 2021 (CN) .......................... 202111138513.5

(51) Int. Cl.
*G06V 10/82* (2022.01)
*G06V 10/774* (2022.01)
(Continued)

(52) U.S. Cl.
CPC ............. *G06V 10/82* (2022.01); *G06N 3/067* (2013.01); *G06V 10/145* (2022.01); *G06V 10/774* (2022.01)

(58) Field of Classification Search
CPC .... G06V 10/82; G06V 10/145; G06V 10/774; G06N 3/067
See application file for complete search history.

(56) References Cited

U.S. PATENT DOCUMENTS

2018/0144248 A1\* 5/2018 Lu .................... G06K 9/6277
2020/0106523 A1 4/2020 Zhang et al.
(Continued)

FOREIGN PATENT DOCUMENTS

| CN | 105388486 | 3/2016 |
| CN | 112418403 | 2/2021 |
| WO | 2019233425 | 12/2019 |

OTHER PUBLICATIONS

Lan, "Research on Spectral Measurement Techniques of Single Photon Technology Based on Compressed Sensing," Full-Text Database of Ph.D. Dissertations in China, 2016.
(Continued)

*Primary Examiner* — Ming Y Hon
(74) *Attorney, Agent, or Firm* — Hodgson Russ LLP

(57) ABSTRACT

A method and an apparatus for camera-free light field video processing with all-optical neural network are disclosed. The method includes: mapping the light field video by a digital micro-mirror device (DMD) and an optical fiber coupler, a two-dimensional 2D spatial optical signal into a one-dimensional 1D input optical signal; realizing a multiply-accumulate computing model in a structure of all-optical recurrent neural network structure, and processing the 1D input signal to obtain the processed signal; and receiving the processed signal and outputting an electronic signal by a photodetector, or receiving the processed signal by a relay optical fiber for relay transmission of the processed signal. The method and system here realize light field video processing without the use of a camera and the whole system is all-optical, thus possessing the advantage in computing speed and energy-efficiency.

10 Claims, 3 Drawing Sheets

(51) Int. Cl.
G06V 10/145 (2022.01)
G06N 3/067 (2006.01)

(56) References Cited

U.S. PATENT DOCUMENTS

| | | | |
|---|---|---|---|
| 2022/0121901 A1* | 4/2022 | Le Gallo-Bourdeau | ............... G06N 3/04 |
| 2022/0138562 A1* | 5/2022 | Biryukova | ........... G06N 3/0481 706/15 |
| 2022/0188576 A1* | 6/2022 | Vijay | ............... G06K 9/6257 |
| 2022/0198265 A1* | 6/2022 | Cintas | ............... G16H 20/00 |

OTHER PUBLICATIONS

Fang et al., "Computational Light Field Imaging," Acta Optica Sinica, Jan. 2020, vol. 40, No. 1.
Lin et al., "All-Optical Machine Learning Using Diffractive Deep Neural Networks," arXiv:1804.08711, 2018.
CNIPA, First Office Action for CN Application No. 202111138513.5, dated Nov. 11, 2021.
CNIPA, Second Office Action for CN Application No. 202111138513.5, dated Dec. 1, 2021.
CNIPA, Notification to Grant Patent Right for Invention for CN Application No. 202111138513.5, dated Dec. 28, 2021.

* cited by examiner

METHOD AND SYSTEM FOR CAMERA-FREE LIGHT FIELD VIDEO PROCESSING WITH ALL-OPTICAL NEURAL NETWORK

CROSS-REFERENCE TO RELATED APPLICATION

This application claims priority to Chinese Patent Application No. 202111138513.5, filed on Sep. 27, 2021, the entire contents of which is incorporated by reference herein.

TECHNICAL FIELD

The disclosure relates to the technical field of optical intelligent computing, and particularly to a light field intelligent processing method and apparatus for all-optical camera-free computing.

BACKGROUND

An electronic solution is used in the existing imaging systems or visual signal processing technologies. In a word, photoelectric conversion is firstly implemented by a camera (photoelectric sensor), and further computations are performed on a silicon-based device (such as a personal computer PC). In such solution, the light emitted from a target scene is projected through an optical lens onto a photosensitive chip (i.e., a photodetector plane), so that an optical signal is converted into an electronic signal. The analog-to-digital conversion of the sensor is performed on the electronic signal again to obtain an electronic signal in a common data form (such as a video frame). The technology for obtaining such data based on frame is a mainstream of image and video processing.

In addition to the above mainstream technology, there is also a single-pixel compression imaging technology in a compressed sensing direction. Visual signals are compressed and collected by using a digital micro-mirror array in the single-photon imaging technology, so that two-dimensional signals are output as single-point one-dimensional signals. After the signals are compressed and collected, photoelectric conversion is immediately performed by the photodetector on the signals in the single-photon imaging technology without going through an optical calculation. This is because the imaging application output is in frame format for visualization.

There are researches on a similar structure in the related fields of sequential optical calculation, such as natural language processing and optical fiber communication. For example, in the existing literature, a natural language processing corpus is serialized and then input into a reservoir system (i.e., a variant of the recurrent neural network) composed of optical fiber loops, optical fiber delay is also used as a feedback mechanism of the recurrent neural network, and weight coupling is performed by signal modulation.

SUMMARY

According to a first aspect of the disclosure, a light field intelligent processing system for all-optical camera-free video processing includes: a sensing module, a recurrent computing module and an output module. The sensing module includes a digital micro-mirror device (DMD) and an optical fiber coupler. The sensing module is configured to map a two-dimensional 2D spatial optical signal into a one-dimensional 1D input signal. The recurrent calculation module is configured to construct a structure of a recurrent neural network (RNN), and calculate the 1D input signal to obtain a processed signal. The RNN structure is expressed as: $h^t = f_{NL}(W_f \cdot h^{t-1} + W_i \cdot x^t + b)$ and $y^t = W_o \cdot h^t$, where $h^t$ represent a hidden state vector in the network at time t, $h^{t-1}$ represent a hidden state vector in the network at time t−1, $x^t$ represents an input vector of the network at time t, and $y^t$ represents an output vector of the network at time t; W represents a corresponding weight, b represents a corresponding bias and $f_{NL}$ represents a non-linear function. The output module includes a photodetector or a relay optical fiber. The photodetector is configured to collect the processed signal to output an electronic signal, and the relay optical fiber is configured to collect the processed signal for relay transmission.

According to a second aspect of the disclosure, a light field intelligent processing method for all-optical camera-free video processing, includes: mapping by a sensing module with a digital micro-mirror device DMD and an optical fiber coupler, a two-dimensional (2D) spatial optical signal into a one-dimensional (1D) input signal; constructing by a recurrent computing module, a structure of a recurrent neural network (RNN), and computing the 1D input signal to obtain a processed signal, in which the RNN structure is expressed as: $h^t = f_{NL}(W_f \cdot h^{t-1} + W_i \cdot x^t + b)$ and $y^t = W_o \cdot h^t$, where $h^t$ represent a hidden state vector in the network at time t, $h^{t-1}$ represent a hidden state vector in the network at time t−1, $x^t$ represents an input vector of the network at time t, and $y^t$ represents an output vector of the network at time t; W represents a corresponding weight, b represents a corresponding bias and $f_{NL}$ represents a non-linear function; and the processed signal is finally collected by a photodetector for outputting an electronic signal, or collected by a relay optical fiber for relay transmission.

The additional aspects and advantages of the disclosure may be set forth in the following specification, and will become obvious from the following description, or may be learned by practice of the disclosure.

BRIEF DESCRIPTION OF THE DRAWINGS

The above and/or additional aspects and advantages of the present disclosure may be obvious and easily understood in descriptions of embodiments in combination with figures.

DETAILED DESCRIPTION

Embodiments of the disclosure are described in detail below, and examples of embodiments are illustrated in the accompanying drawings, in which the same or similar reference numbers represent the same or similar elements or elements with the same or similar functions. The embodiments described below with reference to the drawings are exemplary, are intended to explain the present disclosure and are not to be construed as a limitation of the disclosure.

There are some disadvantages in the above related art. Firstly, since the existing image (video) processing technology follows an architecture of the photoelectric conversion combined with silicon-based calculation, the carrier of this technology is an electronic signal, which leads to not good power consumption and operation speed. Secondly, most of the image (video) processing technologies use frames as an input form of the calculation structure, which leads to a lot of information redundancy.

Hereinafter, a light field intelligent processing method and system for all-optical camera-free video processing according to an embodiment of the disclosure will be described with reference to the accompanying drawings.

Figure 1:
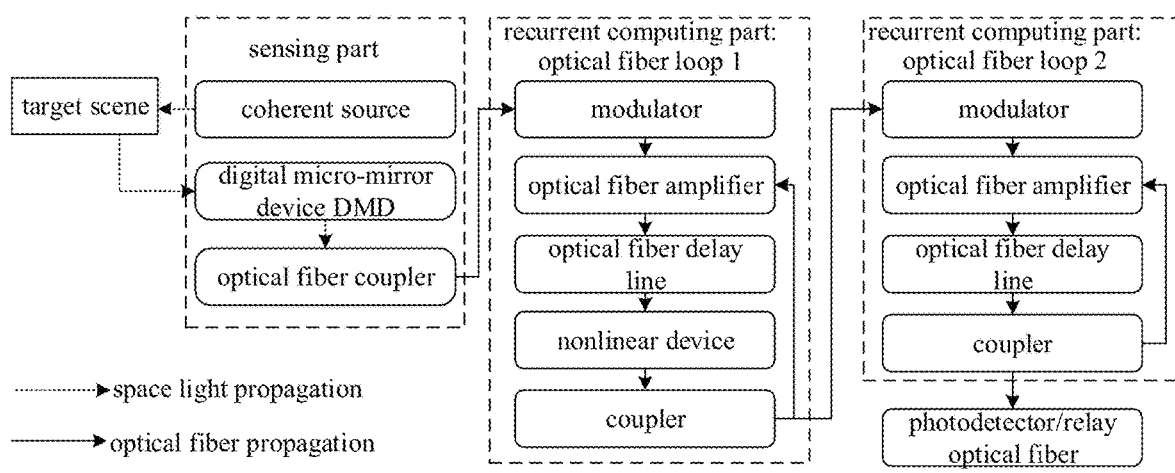
FIG. 1 is an overall block diagram illustrating a light field intelligent processing system for all-optical camera-free video processing according to an embodiment of the disclosure.

The disclosure proposes a photoelectric system in sensing-computing integration, which may be applied to video signal processing. The system framework is shown in FIG. 1. According to a signal transmission medium, the system is mainly divided into a sensing part, a recurrent computing part and an output part.

Figure 2:
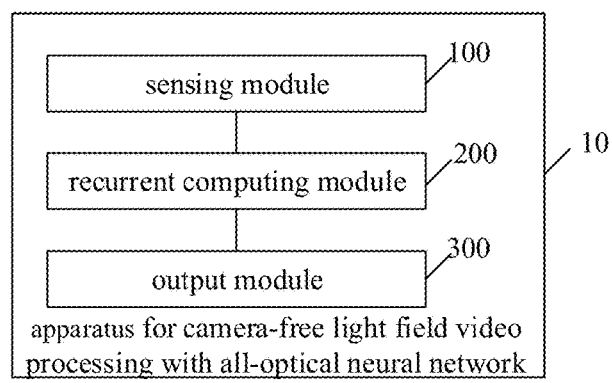
FIG. 2 is a simplified structural schematic diagram illustrating a light field intelligent processing system for all-optical camera-free video processing according to an embodiment of the disclosure.

FIG. 2 is a light field intelligent processing system for all-optical camera-free video processing according to an embodiment of the disclosure. As shown in FIG. 2, the system 10 includes a sensing module 100, a recurrent computing module 200, and an output module 300.

The sensing module 100 is composed of a digital micro-mirror device and an optical fiber coupler and is configured to map a two-dimensional (2D) spatial optical signal into a one-dimensional (1D) input signal.

Figure 3:
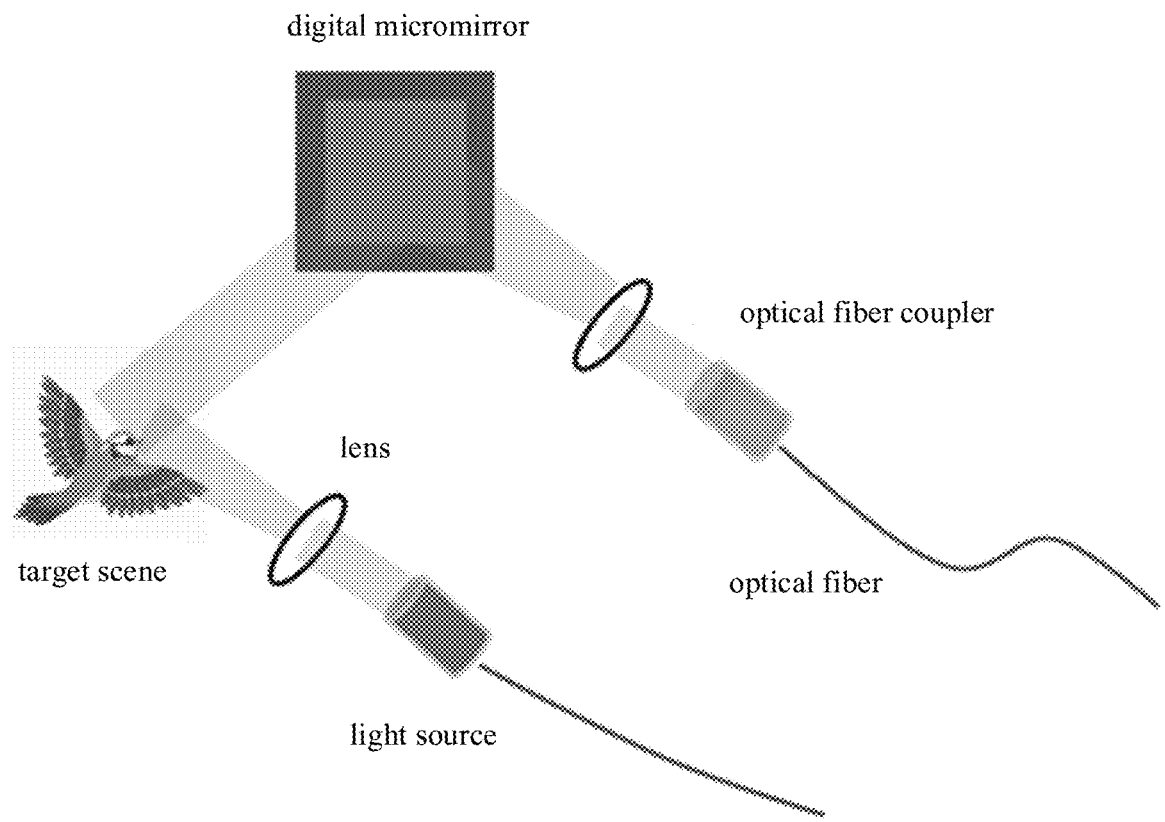
FIG. 3 is a structural schematic diagram illustrating a sensing module of the system according to an embodiment of the disclosure.

It may be understood that, the sensing part of the disclosure is composed of the digital micro-mirror device and the optical fiber coupler as shown in FIG. 3, for compressing the 2D spatial optical signal (coherent laser) into the 1D input signal. In a specific case, a laser beam with a diameter of 2 mm is projected onto the target scene, and the reflected light spot is aligned with the digital micro-mirror array (in which the pixel size is 10.8 μm and the resolution is 1920×1080). The digital micro-mirror device is equivalent to a mirror array with two directions (having positive and negative 12 degree angles relative to the base plane). Information of the target scene may be collected by arranging an orientation of the optical fiber coupler perpendicular to the normal of the tilted part (corresponding to a non-zero area in a mask) of the digital micro-mirror device or by looking for the zero-order main maximum of the reflected light spot.

Furthermore, for each conventional concept "video frame", a set of 256 masks are modulated on the digital micro-mirror, in which each mask is a binary pattern of 1920×1080, so as to obtain a compression feature with the length l=256. The information reflected by the target scene can be completely preserved in the compressed field. From the perspective of compression ratio, the data throughput is greatly reduced compared to a frame with the 1920×1080 resolution. The entire sensing process can be expressed in the equation (1).

$$x_i = <\emptyset_i, F_t> \qquad (1)$$

where $\emptyset_i$ represents a binary mask pattern, $F_t$ represents an incident light intensity at the digital micro-mirror device (DMD) plane at time t, $x_i$ is the i-th component of an output vector, and $<,>$ represents a coupling process from the pattern emitted from the DMD to the fiber.

It may be understood that, the difference between the sensing technology and the current mainstream electronic solution is mainly that, a combination of the digital micro-mirror device with the optical fiber coupler maps a 2D spatial signal into a 1D input signal in the disclosure, which is an all-optical process; while in the electronic solution, the spatial signal is converted into a computable signal usually through the photoelectric conversion, analog-to-digital conversion, serialization and other operations. Although mature digital computing chips can be configured to achieve flexible computations, they are not as good as the technical solution of the disclosure in terms of the power consumption and the response speed.

The recurrent computing module 200 is configured to realize a multiply-accumulate model in a recurrent neural network structure, and process the input signal to obtain the processed signal.

Specifically, the recurrent computing module 200 in the disclosure may include an optical fiber loop, a photodetector, a signal modulator, and a number of optical function elements (as shown in FIG. 1). A structure of the recurrent computing module 200 can be mathematically equivalent to a recurrent neural network (RNN). The basic structure of RNN may be expressed in the equations (2)-(3).

$$h^t = f_{NL}(W_j \cdot h^{t-1} + W_i \cdot x^t + b) \qquad (2)$$

$$y^t = W_o \cdot h^t \qquad (3)$$

where $h^t$ represent a hidden state vector in the network at time t, $h^{t-1}$ represent a hidden state vector in the network at time t−1, $x^t$ represents an input vector of the network at time t, and $y^t$ represents an output vector of the network at time t; W represents a corresponding weight, b represents a corresponding bias and $f_{NL}$ represents a non-linear function.

In terms of device implementation, the two fiber optic loops 1&2 in FIG. 1 respectively perform recurrent connection and full connection operation of the input and output parts of the neural network. It is assumed that the weight $W = w_{ij}$, and $h_{k+1}^t = h_k^t + (w_{kj} \cdot x_j)$, in which a time interval from k to k+1 corresponds to the time $\tau = L/c$ for the optical signal to completely pass through the fiber delay line, and a time interval from t to t+1 corresponds to $\Delta t = l \cdot \tau$, where L and c denote the fiber length and light speed respectively. Essentially in the time period (t, t+1), the modulator is configured to modulate the weight W, the input 1D signal x in the aforementioned sensing part is multiplied with the weight row by row, and the fiber delay line is configured to realize an addition of multiplication at each row in the time, finally achieving a calculation result equivalent to the weighting operation $W \cdot x^t$ or $W \cdot h^t$.

Figure 4:
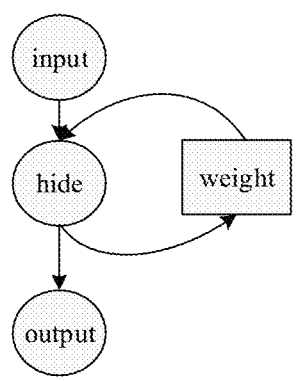
FIG. 4 is a structural schematic diagram illustrating a recurrent neural network (RNN) of the system according to an embodiment of the disclosure.

Further, in conjunction with FIG. 1 and FIG. 4, each optical device realizes a part of functions in the system structure. The modulator is configured to generate a signal sequence w, and couple the signal sequence w with an input signal sequence x to obtain a signal w*x. The optical fiber amplifier is configured to gain the signal by compensating for attenuation of the signal during propagation in the optical fiber. The optical fiber delay line mainly provides delay. For example, the signal with a time interval of 0.1 ms may be performed by optical fiber with length of 20-30 km as it takes 0.1 ms for the optical signal passes through the optical fiber. The coupler is responsible for splitting the light flow, a part of which is output directly and the other part of which is still circulated in the optical fiber loop structure. The non-linear device is configured to provide a non-linear response function by generally using a semiconductor optical amplifier (SOA), in which the curve of the non-linear response function is in a shape of saturated absorption.

Figure 5:
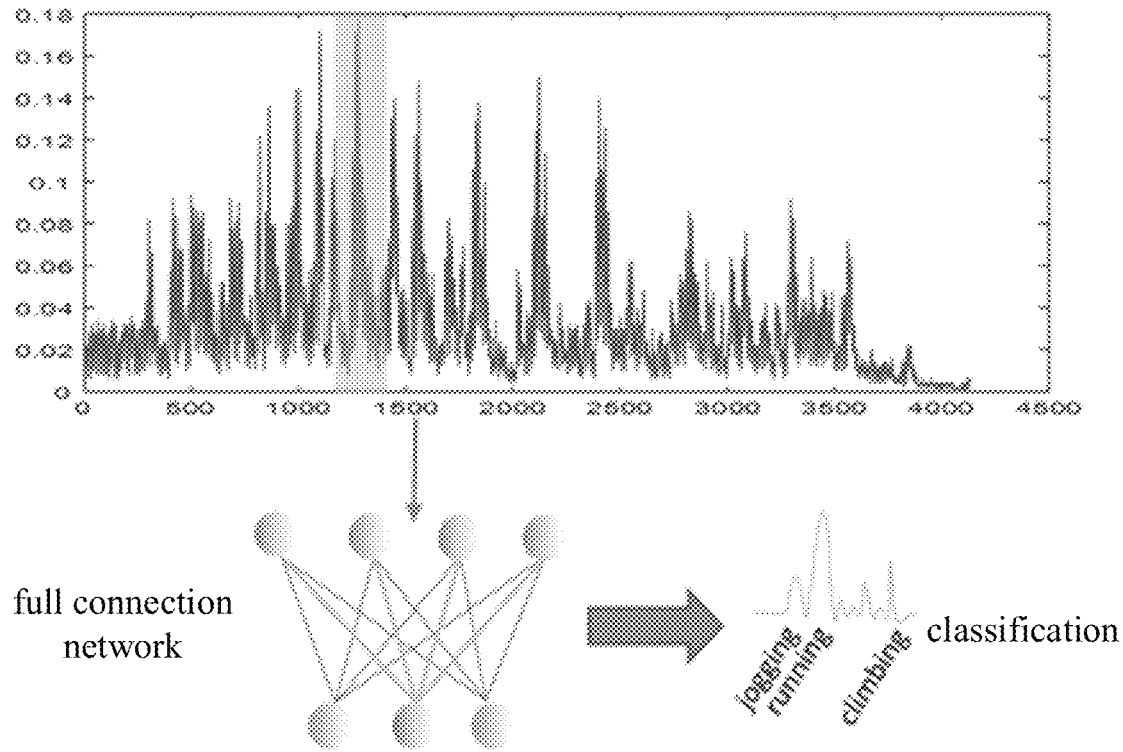
FIG. 5 is a schematic diagram illustrating computation of an optical fiber loop 2 according to an embodiment of the disclosure.

Further, as shown in FIG. 5, the optical fiber loop 2 performs full connection operation on the output vector of the optical fiber loop 1, and a classification result of the input image (frame) is obtained after performing maximum value judgment on the output vector.

It should be noted that in the computing part, the weight W modulated by the signal modulator needs to be generated by the neural network in a joint training way with the mask Ø modulated by the digital micro-mirror in the sensing part. For different training set, the weight modulated by the signal modulator is also different. The computing part in the disclosure aims to process the collected input signal to reduce data flux of the transmission link. Compared with the electronic solution relying on the silicon-based integrated circuit, since the disclosure adopts a design based on the optical fiber from the whole and realizes the multiply-accumulate model in the RNN structure, high-speed computations are supported and it is helpful to integration with communication systems.

The output module 300 includes a photodetector or a relay optical fiber, in which the photodetector is configured to collect the processed signal and output an electronic signal, and the relay optical fiber is configured to perform relay transmission of the processed signal.

It may be understood that the output module 300 in the disclosure is a signal output part. The photodetector can be directly connected to output the electronic signal. Alternatively, the long optical fiber with low loss can be connected for long-distance relay transmission, which is suitable for application scenarios such as large-throughput transmission in a data center or signal sensing in special environments.

According to the light field intelligent processing system for all-optical camera-free video processing in the embodiment of the disclosure, the sensing module is composed of the digital micro-mirror device and the optical fiber coupler, for mapping the 2D spatial light signal into the 1D input signal; the recurrent computing module realizes the multiply-accumulate model in the RNN structure and processes the input signal to obtain the processed signal; the output module includes the photodetector for receiving the processed signal and outputting the electronic signal, or a relay optical fiber for relay transmission of the processed signal. The disclosure proposes a light field imaging system based on the optical loop neural network which integrates sensing and intelligent calculation. Compared with the existing light field imaging system with separate sensing and calculation, the proposed system has a great improvement on the response speed, energy consumption, and transmission bandwidth.

As an example, the disclosure may use a photodetector signal as a trigger of the feedback signal in the RNN at the junction of the head and tail of the optical fiber for improving the signal-to-noise ratio.

As another example, the disclosure may use a single-layer loop to output an intermediate processing result and transmit the result to a back-end workstation for further calculation.

As another example, the DMD in this specification may be replaced with a fixed mask at the sensing end to reduce the cost.

In summary, the spatial optical signal of the disclosure is collected in a way of dimension reduction and compression, and the 2D spatial light intensity is converted into a 1D optical fiber signal through the DMD modulated mask. The principle of sensing module is adopted to reduce the bandwidth while ensuring the form of the optical signal continuous and avoiding the photoelectric conversion. The recurrent computing module is based on the optical fiber loop which realizes the RNN structure, which can be used as a general recurrent computing module and it is expected to realize a large-scale all-optical network computing system through cascade. In training and deploying the network structure, a large number of network parameters are involved in the entire system, including the pattern modulated by the DMD, the signal modulated by the modulator, and the working voltage of the optical fiber amplifier. The disclosure adopts a combination of random generation and gradient descent to construct a specific training set, and generates network parameters in a specific scene by training the RNN structure with the specific training set, to ensure credibility of the output of the calculation part. For example, in the case where the input is a human body action sequence, the accuracy rate of action classification output by the calculation part can reach more than 90%. In an embodiment, the network parameters are generated by a training module which is implemented by a processor.

The disclosure is aimed at application scenarios where a bandwidth is required but raw data is not strictly required, such as continuous automatic monitoring. The architecture proposed in the disclosure uses optical signals as carriers. The disclosure has advantages in some application scenarios that require relatively high response speed, such as industrial monitoring. In addition, the 2D visual signal in the disclosure is mapped to the 1D compressed form at the beginning of the collection/sensing part, so that the information of the target scene is kept to the greatest extent for processing by the calculation part, and the bandwidth transmission requirements of the entire system are thus reduced.

Figure 6:
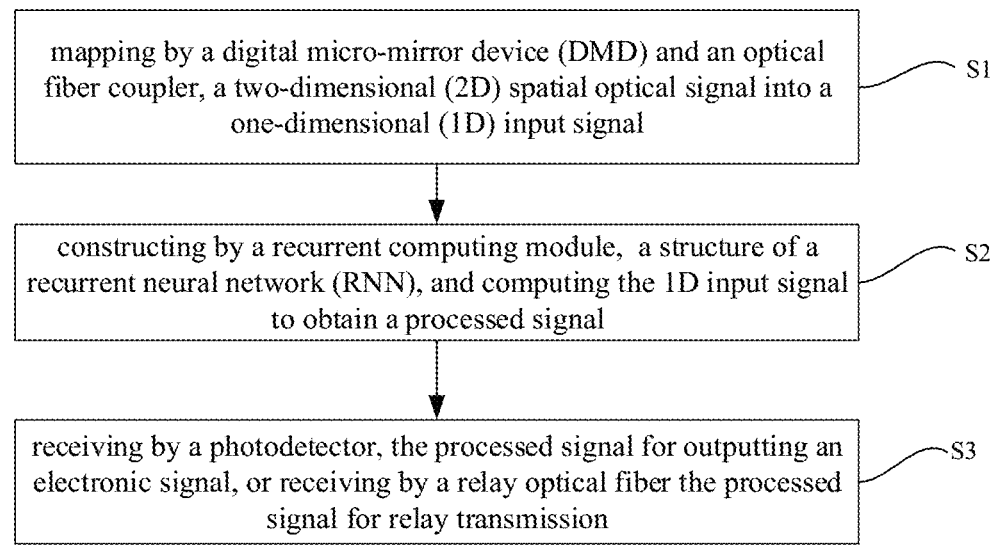
FIG. 6 is a flowchart illustrating a light field intelligent processing method for all-optical camera-free video processing according to an embodiment of the disclosure.

FIG. 6 is a flowchart illustrating a light field intelligent processing method for all-optical camera-free video processing according to an embodiment of the disclosure.

As shown in FIG. 6, the light field intelligent processing method includes the following steps at S1 to S3.

At S1, a two-dimensional 2D spatial optical signal is mapped into a one-dimensional 1D input signal by a sensing module with a digital micro-mirror device DMD and an optical fiber coupler.

At S2, a structure of a recurrent neural network (RNN) is realized by a recurrent computing module, and the 1D input signal is calculated to obtain a processed signal.

At S3, the processed signal is collected by a photodetector and an electronic signal is output, or the processed signal is collected by a relay optical fiber for relay transmission.

The light field intelligent processing method in the embodiment of the disclosure, the 2D spatial optical signal mapped into the 1D input signal by the combination of the DMD and the optical fiber coupler; the multiply-accumulate model in the RNN structure is realized, and the 1D input signal is processed to obtain the processed signal; the processed signal is collected by the photodetector and the electronic signal is output, or the processed signal is transmitted by the relay optical fiber. The disclosure proposes a light field imaging method based on the optical loop neural network which integrates sensing and intelligent calculation. Compared with the existing light field imaging method with separate sensing and computing, the proposed method has a great improvement on the response speed, energy consumption, and transmission bandwidth.

In addition, the terms "first" and "second" are only for describing purposes and are not to be construed as indicating or implying relative importance or implicitly indicating the number of technical features indicated. Thus, features limiting "first" and "second" may explicitly or implicitly include at least one of the features. In the description of the disclosure, the wording "a plurality of" means at least two, for example, two, three, unless otherwise expressly and specifically stated.

In the description of the specification, descriptions with reference to terms "an embodiment", "some embodiments", "example", "specific example" or "some examples" mean specific features, structures, materials or characteristics described in combination with the embodiment or example are included in at least an embodiment or example of the disclosure. In this specification, the schematic representations of the above terms do not have to be the same embodiment or example. Moreover, specific features, structures, materials or characteristics described may be combined in one or more embodiments or examples in a suitable manner. Furthermore, embodiments or examples described in the specification, as well as features of embodiments or examples, may be combined without conflicting with each other.

Although the embodiments of the disclosure have been illustrated and described above, it may be understood that the above-mentioned embodiments are exemplary and should not be construed as a limitation to the disclosure. Those skilled in the art may make various changes, modifications, substitutions and alterations for the above-mentioned embodiments within the scope of the disclosure.

What is claimed is:

1. A light field intelligent processing system for all-optical camera-free video processing, comprising:
    a collection module with a digital micro-mirror device (DMD) and an optical fiber coupler, configured to map a two-dimensional (2D) spatial optical signal into a one-dimensional (1D) input signal through the combination of the DMD and the optical fiber coupler;
    a recurrent computing module, configured to construct a recurrent neural network structure, and calculate the input signal to obtain a preprocessed signal, in which the recurrent neural network structure is expressed as:

$h^t = f_{NL}(W_f h^{t-1} + W_i x^t + b)$ $y^t = W_o \cdot h^t$ where $h^t$ represent a hidden state vector in the network at time t, $h^{t-1}$ represent a hidden state vector in the network at time t−1, $x^t$ represents an input vector of the network at time t, and $y^t$ represents an output vector of the network at time t; W represents a corresponding weight, where $W_i$ is an input weight, $W_o$ is an output weight, $W_f$ is a feedback weight, b represents a corresponding bias and $f_{NL}$ represents a non-linear function; and
    an output module comprising a photodetector or a relay optical fiber, in which the photodetector is configured to collect the preprocessed signal to output an electronic signal, and the relay optical fiber is configured for relay transmission of the preprocessed signal through the relay optical fiber.

2. The system of claim 1, wherein the collection module is further configured to:
    collect the 2D spatial optical signal in a dimensionality reduction and compression manner;
    map the 2D spatial optical signal into the 1D input signal through a mask modulated by the DMD; and
    enable the optical signal continuous by compressed sensing.

3. The system of claim 2, wherein the recurrent computing module further comprises a training module for constructing a training set to train and deploy the recurrent neural network structure and generating network parameters.

4. The system of claim 1, wherein the recurrent computing module comprises an optical fiber loop, configured to sequentially execute the recurrent neural network structure as a carrier for signal transmission and coupling.

5. The system of claim 4, wherein the optical fiber loop comprises a modulator, an optical fiber amplifier, an optical fiber delay line, a coupler, and a nonlinear device.

6. The system of claim 5, wherein:
    the modulator is configured to generate a signal sequence w, and couple the signal sequence w with an input signal sequence x to obtain a weighted signal w*x;
    the optical fiber amplifier is configured to gain the optical signal by compensating for attenuation of the optical signal during propagation in the optical fiber;
    the optical fiber delay line is configured to provide a delay by coupling a signal with a time interval;
    the coupler is configured to split a light flow proportionally, so that a part of the light flow is directly output, and the remaining part of the light flow is circulated in the optical fiber loop; and
    the non-linear device is configured to provide a non-linear response function, in which the curve of the non-linear response function is in a shape of saturated absorption.

7. The system of claim 6, wherein the recurrent computing module further comprises a training module for constructing a training set to train and deploy the recurrent neural network structure and generating network parameters.

8. The system of claim 7, wherein the network parameters in the training module include: a pattern modulated by the DMD, a signal modulated by the modulator, and a working voltage of the optical fiber amplifier.

9. The system of claim 8, wherein the recurrent computing module is further configured to generate the network parameters in a specific scene by constructing a specific training set in a way combining random generation and gradient descent.

10. A light field intelligent processing method for all-optical camera-free video processing, performed by the system according to claim 1, the method comprising:
    mapping by a combination of a digital micro-mirror device (DMD) and an optical fiber coupler, a two-dimensional (2D) spatial optical signal into a one-dimensional (1D) input signal;
    constructing an additive-multiplicative model in a recurrent neural network structure, and computing the input signal to obtain a preprocessed signal; and
    receiving by a photodetector, the preprocessed signal for outputting an electronic signal, or receiving by a relay optical fiber the preprocessed signal for relay transmission.

* * * * *